Patented June 16, 1936

2,044,116

UNITED STATES PATENT OFFICE 2,044,116

PROCESS FOR THE SEPARATION OF CARBONIC ACID FROM GASES CONTAINING THE SAME

Ernst Hackhofer and Annemarie Beuther, Krefeld-Uerdingen, Germany, assignors to I. G. Farbenindustrie Aktiengesellschaft, Frankfort-on-the-Main, Germany No Drawing. Application March 23, 1933, Serial No. 662,388. In Germany April 12, 1932

8 Claims. (Cl. 23—150)

The present invention concerns the separation of carbonic acid from gases containing the same by causing a solution of an alkali metal monochromate, such as sodium monochromate and potassium monochromate, to act under pressure at an elevated temperature on gases containing carbonic acid and liberating the carbonic acid absorbed by reducing the pressure of the solution. The withdrawal of the carbonic acid may take place at the same temperature as the absorption of the same or alternatively at a higher temperature than the absorption temperature.

The invention is based on the feature, first established by us that alkali metal monochromate solutions are capable of absorbing considerable quantities of carbonic acid from gases containing carbonic acid at elevated temperatures and pressures, in particular at temperatures between about 40 and 50 up to about 100° C. and that the carbonic acid absorbed in this manner can be recovered by a simple pressure reduction of the solution. The temperature interval between about 60 and about 80° C. and a partial pressure interval of the carbonic acid from about 5 to about 20 atmospheres are particularly suitable for carrying out the process.

While generally it is not economical to exceed the temperature limit of 100° C. in the process it should nevertheless be pointed out that the absorption of carbonic acid by the alkali metal chromate solution as well as the withdrawal of the carbonic acid from the alkali metal chromate solution can be effected at temperatures exceeding 100° C. When proceeding at higher temperatures a higher pressure must naturally be employed. The upper limit for the pressure range and consequently also for the temperature range for which the process is feasible is limited merely by the resistivity of the construction materials and obviously the pressure for a given temperature must be such that evaporation of the chromate solution is avoided. It may be mentioned that the compression energy of the gas can be recovered by driving a gas power engine with the gas coming from the absorption plant, thus the process being economical even if performed at high pressures.

The escape of water vapour during the reduction of pressure can be avoided to a large extent by the use of a pressure condenser. Care must be taken that when a substantial amount of water has escaped an equal amount of water is added in order to avoid evaporation of the solution.

As the lower pressure limit a partial pressure of the carbonic acid of about 2 atmospheres is practicable for the working of the carbonic acid absorption.

It should be noted that the withdrawal of the carbonic acid can be facilitated by the use of reduced pressure or vacuum.

According to the process of the invention one cubic metre of a saturated solution of sodium monochromate, for example, heated to 60–80° C. absorbs in 1 hour 70 kgs. of carbonic acid at a carbonic acid partial pressure of 5 atmospheres, and the carbonic acid is recovered practically completely in a high degree of purity by reducing the pressure at the same temperature. Brisk stirring of the chromate solution is recommended for facilitating the absorption as well as the withdrawal of the carbonic acid. Furthermore the withdrawal of the carbonic acid can be assisted by heating the solution above the temperature prevailing during the absorption.

The process can serve for the separation of carbonic acid from mixtures of gases, which under the given reaction conditions do not exert a reducing action on the chromate solutions, thus, for example, for the separation of carbonic acid from mixtures of nitrogen, oxygen, rare gases and the like. The reducing gases present in some technical gas mixtures, such as for example, hydrogen sulphide and sulphur dioxide should be removed in the known manner before introducing the gas mixture into the chromate solution.

The following example will further illustrate the invention:—

A waste gas from a lime kiln containing 36% carbonic acid, after removal of sulphur dioxide in the known manner, is led at 60–70° C. at a pressure of about 15 atmospheres into a sodium monochromate solution, containing 750 grams of sodium monochromate per litre, the absorption of the carbonic acid being assisted by brisk stirring of the chromate solution by means of a stirring apparatus. The chromate solution absorbs per litre and per hour approximately 80 grams of carbonic acid and indeed may absorb up to the maximum of about 100 grams per litre. On reducing the pressure the liquid, from which sodium bicarbonate has separated in the form of a magma, yields the absorbed carbonic acid almost completely. The resulting carbonic acid is substantially free from impurities.

We claim:

1. Process for the separation of carbonic acid from gases by reacting with a solution of an alkali metal monochromate under superatmospheric pressure at elevated temperature on a gas mixture comprising carbonic acid which gas mixture is free from constituents which exert a reducing action on said alkali metal monochromate under the reaction conditions and liberating the absorbed carbonic acid by reducing the pressure.

2. Process for the separation of carbonic acid from gases by reacting with a solution of an alkali metal monochromate under superatmospheric pressure at a temperature above 40° C. on a gas mixture comprising carbonic acid which gas mixture is free from constituents which exert a reducing action on said alkali metal monochromate under the reaction conditions and liberating the absorbed carbonic acid by reducing the pressure.

3. Process for the separation of carbonic acid from gases by reacting with a solution of sodium monochromate under superatmospheric pressure at a temperature from about 40 to about 100° C. on a gas mixture comprising carbonic acid which gas mixture is free from constituents which exert a reducing action on said alkali metal monochromate under the reaction conditions and liberating the absorbed carbonic acid by reducing the pressure.

4. Process for the separation of carbonic acid from gases by reacting with a solution of sodium monochromate under superatmospheric pressure at a temperature from about 60 to about 80° C. on a gas mixture comprising carbonic acid which gas mixture is free from constituents which exert a reducing action on said alkali metal monochromate under the reaction conditions and liberating the absorbed carbonic acid by reducing the pressure.

5. Process for the separation of carbonic acid from gases by reacting with a solution of sodium monochromate at a temperature from about 60 to about 80° C. and a pressure from about 5 to about 20 atmospheres on a gas mixture comprising carbonic acid which gas mixture is free from constituents which exert a reducing action on said alkali metal monochromate under the reaction conditions and liberating the absorbed carbonic acid by reducing the pressure.

6. Process for the separation of carbonic acid from gases by reacting with a solution of sodium monochromate at a temperature from about 60 to about 80° C. and a pressure from about 5 to about 20 atmospheres on a gas mixture comprising carbonic acid which gas mixture is free from constituents which exert a reducing action on said alkali metal monochromate under the reaction conditions and liberating the absorbed carbonic acid by reducing the pressure, both steps of the process being performed at practically the same temperature.

7. Process for the separation of carbonic acid from gases by reacting with a solution of sodium monochromate at a temperature from about 60 to about 80° C. and a pressure from about 5 to about 20 atmospheres on a gas mixture comprising carbonic acid which gas mixture is free from constituents which exert a reducing action on said alkali metal monochromate under the reaction conditions and liberating the absorbed carbonic acid by reducing the pressure at a temperature higher than that of the absorption temperature.

8. Process for the separation of carbonic acid from a sulfur dioxide-free lime kiln waste gas which comprises reacting with such a gas on a solution of sodium monochromate at a temperature from 60 to 70° C. at a pressure of about 15 atmospheres and recovering the carbonic acid by pressure reduction, the absorption and recovering of the carbonic acid being assisted by brisk stirring of the solution.

ERNST HACKHOFER.
ANNEMARIE BEUTHER.